US012214871B2

(12) United States Patent
Kuperman et al.

(10) Patent No.: US 12,214,871 B2
(45) Date of Patent: Feb. 4, 2025

(54) DRONE ARMS LOCKING/DEPLOYMENT MECHANISM

(71) Applicant: SPEAR U.A.V LTD, Tel Aviv (IL)

(72) Inventors: Gedalia Kuperman, Tel Aviv (IL); Shay Yitshak, Mishmar David (IL)

(73) Assignee: SPEAR U.A.V LTD, Tel Aviv (IL)

( * ) Notice: Subject to any disclaimer, the term of this patent is extended or adjusted under 35 U.S.C. 154(b) by 39 days.

(21) Appl. No.: 17/750,546

(22) Filed: May 23, 2022

(65) Prior Publication Data
US 2022/0388653 A1   Dec. 8, 2022

(30) Foreign Application Priority Data

May 24, 2021 (IL) .......................................... 283403

(51) Int. Cl.
*B64C 39/02* (2023.01)
*B64C 27/33* (2006.01)
(Continued)

(52) U.S. Cl.
CPC .............. *B64C 27/33* (2013.01); *B64C 39/02* (2013.01); *B64U 10/14* (2023.01); *B64U 30/293* (2023.01); *B64U 80/70* (2023.01)

(58) Field of Classification Search
CPC ....... B64C 39/024; B64C 27/33; B64C 27/08; B64C 27/35; B64C 27/37; B64U 10/13;
(Continued)

(56) References Cited

U.S. PATENT DOCUMENTS

| 4,600,167 A | 7/1986 | Kastenhuber |
| 7,147,181 B2 | 12/2006 | Selin |

(Continued)

FOREIGN PATENT DOCUMENTS

| CN | 204998749 U | 1/2016 |
| CN | 106184704 A | 12/2016 |

(Continued)

OTHER PUBLICATIONS

CN-110683069-A Translation (Year: 2020).*
CN-109305350-A Translation (Year: 2019).*
https://www.youtube.com/channel/UC9KkR7xDZexOKH6ZZVR-udA.

*Primary Examiner* — Christopher D Hutchens
*Assistant Examiner* — Steven J Shur
(74) *Attorney, Agent, or Firm* — CANTOR COLBURN LLP

(57) ABSTRACT

The present disclosure provides a deployment mechanism for arms of a drone. This mechanism is particularly of relevance to a drone that is housed in a container and is configured to be launched therefrom, and therefore is required to have an efficient deployment mechanism for its arms to be deployed immediately after the launch. The deployment mechanism is biased to its deployed state and is retained in its non-deployed state by external forces, such as the normal forces that are applied by the walls of the container on the arms while the drone is housed within the container. After the launch from the container, the above-mentioned forces are no longer applied to the arms of the drone and the deployment mechanism, causing a transition of the arms from their non-deployed state to their deployed state, in which they are in a position suitable for flying, i.e. activation of the rotors mounted on the arms.

13 Claims, 11 Drawing Sheets

(51) Int. Cl.
  *B64U 10/14* (2023.01)
  *B64U 30/293* (2023.01)
  *B64U 80/70* (2023.01)

(58) Field of Classification Search
  CPC ...... B64U 30/20; B64U 80/70; B64U 30/293; B64U 20/50; B64U 30/296; B64U 60/40
  See application file for complete search history.

(56) References Cited

U.S. PATENT DOCUMENTS

| | | |
|---|---|---|
| 9,470,477 B2 | 10/2016 | Su |
| 9,527,596 B1 | 12/2016 | Adams |
| 9,632,501 B1 | 4/2017 | Yang |
| 10,442,554 B2 | 10/2019 | Andryukov |
| 10,641,590 B2 | 5/2020 | Buttolph |
| 2003/0089820 A1 | 5/2003 | Martorana |
| 2008/0093501 A1 | 8/2008 | Miller |
| 2012/0068010 A1 | 3/2012 | Bossert |
| 2014/0117147 A1 | 5/2014 | Hanna |
| 2015/0259066 A1* | 9/2015 | Johannesson ........ B64C 27/08 244/17.27 |
| 2015/0266578 A1 | 9/2015 | Elkins |
| 2015/0267996 A1 | 9/2015 | Su |
| 2016/0137312 A1 | 5/2016 | Osterhout |
| 2016/0293015 A1 | 10/2016 | Bragin |
| 2016/0347476 A1 | 12/2016 | Andryukov |
| 2017/0057635 A1 | 3/2017 | Strayer |
| 2017/0144078 A1 | 5/2017 | Yamada |
| 2017/0144776 A1 | 5/2017 | Fisher |
| 2017/0146137 A1 | 5/2017 | Koelzer |
| 2017/0166308 A1 | 6/2017 | Desrochers |
| 2017/0269609 A1 | 9/2017 | Bradlow |
| 2018/0364695 A1 | 12/2018 | Ponnarasseri |
| 2019/0077503 A1 | 3/2019 | Reddy |
| 2021/0107645 A1 | 4/2021 | Izraelevitz |

FOREIGN PATENT DOCUMENTS

| | | | | |
|---|---|---|---|---|
| CN | 109305350 A | * | 2/2019 | ............ B64C 27/08 |
| CN | 110683069 A | * | 1/2020 | |
| GB | 2205798 A | | 12/1988 | |
| WO | 2018106235 A1 | | 6/2018 | |
| WO | 2018229747 A1 | | 12/2018 | |
| WO | 2020144689 A1 | | 7/2020 | |
| WO | 2020144690 A1 | | 7/2020 | |
| WO | 2020144691 A1 | | 7/2020 | |

* cited by examiner

DRONE ARMS LOCKING/DEPLOYMENT MECHANISM

CROSS REFERENCE TO RELATED APPLICATION

This application is related to and claims the benefit of Israeli Patent Application Number 283403 filed on May 24, 2021, the entire contents of which are incorporated by reference herein.

TECHNOLOGICAL FIELD

The present disclosure is in the field of drone launching, in particular in the field of drone arms locking and deployment mechanism.

BACKGROUND ART

References considered to be relevant as background to the presently disclosed subject matter are listed below:
WO 2018/229747
WO 2020/144691
WO 2020/144689
WO 2020/144690

Acknowledgement of the above references herein is not to be inferred as meaning that these are in any way relevant to the patentability of the presently disclosed subject matter.

GENERAL DESCRIPTION

The present disclosure provides a deployment mechanism for arms of a drone. This mechanism is particularly of relevance to a drone that is housed in a container and is configured to be launched therefrom, and therefore is required to have an efficient deployment mechanism for its arms to be deployed immediately after the launch. The deployment mechanism is biased to its deployed state and is retained in its non-deployed state by external forces, such as the normal forces that are applied by the walls of the container on the arms while the drone is housed within the container. After the launch from the container, the above-mentioned forces are no longer applied to the arms of the drone and the deployment mechanism, causing a transition of the arms from their non-deployed state to their deployed state, in which they are in a position suitable for flying, i.e. activation of the rotors mounted on the arms.

The deployment mechanism comprises a biasing assembly that includes a biasing element, typically a spring, that prior to the launch is in its first, non-biased state, namely tensioned, and thus causing a biasing force of the biasing assembly against the arms. The biasing force may be applied on the arms by other elements/members of the biasing assembly that are displaceable with the biasing element. Thus, the biasing element causes members/elements of the biasing assembly to displace therewith, and interfacing elements of the biasing assembly interface with the arms and urge them into their deployed state while there is no balancing force such as the normal forces applied by the walls of the container prior to the launch of the drone therefrom. During the displacement of the biasing element, it is transitioned from its first state to its second, biased, state that is defined at the end of the range of its displacement from the initial first state. During the transition, the biasing element constantly applies force that causes the biasing assembly to displace. It is to be noted that the biasing element, also in its biased state, may still be tensioned to some degree, which applies some biasing force, but less than the non-biased state. When the arms reach the deployed state, the biasing assembly is configured to lock the arms in this position and maintain them deployed, e.g. by applying a locking force on a portion of the arms.

Thus, an aspect of the present disclosure provides a drone comprising a body defining a central axis. The drone further comprising two or more arms, each arm (i) comprises a rotor disposed at a distal end portion, and (ii) being pivotally coupled to the body at a proximal end portion to allow a pivotal transition between a first, non-deployed state in which the arms extend substantially in the central axis direction, and a second, deployed state in which the arms extend from the body substantially in the radial direction. The drone further comprising a biasing assembly that comprises (i) at least one biasing element, e.g. a spring, and (ii) at least one interfacing element. The interfacing element is displaceable by the biasing element, thus is biased to displace by the biasing element, between a first state, which is defined along a range of positions of the biasing assembly, and a second state. The first state is characterized by being less biased than the second state, namely the biasing force that is applied by the biasing element in the first state is greater than the second state, thus the first state is defined throughout the application as a non-biased state and the second state is defined throughout the application as a biased state. The drone and its biasing assembly are configured such that (i) during the displacement of the at least one interfacing element, namely while transitioning between the non-biased state to the biased state, each interfacing element is configured to engage the proximal end portion of each respective arm so as to apply a biasing force sufficient to cause the transition of the arm between the non-deployed state and the deployed state, namely said pivotal transition and (ii) when the biasing assembly is in the biased state, each interfacing element restricts the pivotal movement of the arm and restrains it in the deployed state. It is to be noted, as mentioned above, that the non-biased state is defined along a range of positions of the biasing assembly. These positions are typically defined by a range of continuous angular positions about the pivoting element. The interfacing element interfaces with a portion of the arm at least at some of this range, but not necessarily the entire range. Namely, in some range of positions of the non-biased state of the biasing assembly the interfacing element may not interface with the arm, e.g. at an extreme position of the non-biased state, and after a certain extent of movement of the biasing assembly, the interfacing element interfaces with the arm and begins to cause its movement.

It is to be noted that any combination of the described embodiments with respect to any aspect of this present disclosure is applicable. In other words, any aspect of the present disclosure can be defined by any combination of the described embodiments.

In some embodiments of the drone, wherein each arm has its own respective interfacing element. Namely, the drone comprising equal number of interfacing elements and arms.

In some embodiments of the drone, the two or more arms are generally axial-symmetric, namely each arm behaves similar to the other arms with respect to the central axis, though each in a different radial direction with respect to the central axis.

In some embodiments of the drone, the interfacing element is a bearing that bears on an integral lever portion of the arm. The lever portion is a part of the proximal portion of the arm.

In some embodiments of the drone, the arm is pivoted to the body by a pivot in between a main arm portion and the lever portion.

In some embodiments of the drone, the lever portion has an interfacing rim portion, and the interfacing element interfaces with said rim portion during said transition.

In some embodiments of the drone, each of the interfacing elements slides on said interfacing rim portion during said transition.

In some embodiments of the drone, the rim portion is substantially planar.

In some embodiments of the drone, the rim portion comprises a planar segment and a curved segment, wherein during the displacement of the biasing element from the non-biased state to the biased state, the bearing slides on both planar and curved segments.

In some embodiments of the drone, in the non-biased state, the rim portion is located axially to the interfacing element, namely along the central axis direction, below the interfacing element, where the upward direction is defined as the direction towards the body; and in the biased state, the rim portion located radially to the interfacing element, namely the interfacing element is disposed in the biased state along the radial axis between the lever portion and the biasing element/the displaceable member.

In some embodiments of the drone, the lever portion comprises a hollowed portion for reducing weight of the arm, while maintaining its dimensions and shape for allowing the interfacing element to apply the desired torque.

In some embodiments of the drone, in the non-biased state, the hollowed portion is located axially to the rim portion, and in the biased state the hollowed portion located radially to the rim portion.

In some embodiments of the drone, the lever portion is generally angled with respect to the main arm portion.

In some embodiments of the drone, the biasing element is a spring.

In some embodiments of the drone, the transition between the biased state and a non-biased state causes the simultaneous transition between the non-deployed state and the deployed state.

In some embodiments of the drone, the biasing assembly comprises an axially displaceable member that is biased, by the biasing element, to displace between a retracted state to an extended state. The displaceable member is coupled to the interfacing element and causes displacement of the interfacing element between respective non-biased and biased states.

In some embodiments of the drone, the displaceable member is an annular piston displaceable along a central shaft that guides displacement of said member. The biasing element is a helical spring fitted around said shaft and received in a spring seat within the piston.

In some embodiments of the drone, the displaceable member is displaced along a rigid guiding element.

In some embodiments of the drone, the displaceable member displaces along the central axis.

In some embodiments of the drone, the displaceable member comprises radial projections holding said interfacing element(s).

In some embodiments of the drone, the radial projections have tangential pins, and the interfacing element is a bearing mounted on said pins. The bearing may revolve about said pins.

In some embodiments of the drone, the biasing assembly is coupled to the body such that it is capable of moving on a plane defined normal to the central axis.

In some embodiments of the drone, the displaceable member is rotatable about at least two axes in said plane.

In some embodiments of the drone, said displaceable member comprise a lumen and the biasing assembly comprises a shaft being received within said lumen to allow the displacement of the displaceable member, wherein the transversal cross section of the lumen is larger than the transversal cross section of the shaft, allowing the displaceable said moving on said plane and the rotation about at least two axes in said plane. Namely, there is a gap between the shaft and the inner walls of the lumen that provide tolerance in the movement of the displaceable member. This is important to allow the displaceable member the required tolerance to firmly lock at least three arms of the drone.

In some embodiments of the drone, the at least one interfacing element is constituted by a projection, wherein the projection is coupled to or integrally formed with the displaceable member.

In some embodiments of the drone, the projections being the interfacing elements are configured to engage with an integral lever portion of the arm.

In some embodiments of the drone, said projection projects normal to the central axis.

In some embodiments of the drone, said projection is fitted with an adjustable extension for adjusting the effective length of the projection. The adjustable extension is provided to compensate inaccuracies in the manufacturing process, allowing to adjust the effective lengths of the projections, i.e. the interfacing elements, to ensure that the locking of the arms is sufficient and not allowing any movement thereof.

In some embodiments of the drone, the adjustable extension is a screwing element fitted within a screwing space of the projection, e.g. an internal thread formed within a lumen of the projection.

In some embodiments of the drone, each arm comprises a limiting edge formed at the proximal end to limit the axial displacement of the biasing assembly and in particular to limit the axial displacement of the displacement member.

In some embodiments of the drone, the limiting edge is configured to engage one or more of the at least one interfacing element while the arms are in the deployed state, therefore, restricting the movement of the biasing assembly.

In some embodiments of the drone, when the biasing assembly is in the non-biased state the proximal portion of each arm is located between each of the respective at least one interfacing element and the rotor along axes defined parallel to the central axis such that a displacement directionality along the central axis of the at least one interfacing element causes the engagement of it with the proximal portion of the arm. Namely, the order of the elements of the drone in the non-biased state along such axes is: the drone's body, the interfacing elements, the proximal portion of the arm, the distal portion of the arm with the rotor on its edge.

Another aspect of the present disclosure provides a container that includes the drone of any one of the above-described embodiments.

In some embodiments of the container, the drone is housed within the container with its arms in a non-deployed state.

Yet another aspect of the present disclosure provides a method for deploying arms of a drone following its launch from a container. The drone comprising a body defining central axis and each arm (i) comprises a rotor disposed at a distal end portion, and (ii) being pivotally coupled to the body at a proximal end portion to allow a pivotal transition between a first, non-deployed state in which the arms extend substantially in the axial direction, and a second, deployed state in which the arms extend from the body substantially in the radial direction. The method comprising applying a single biasing force causing simultaneous transition of all the arms between the non-deployed state to the deployed state. The biasing force is constantly applied during the housing of the drone in the container and the arms retained in their non-deployed state due to a balancing force applied by the walls of the container. Once the drone is launched from the container, the single biasing force causes the four arms to simultaneously transition to the deployed state.

In some embodiments of the method, the biasing force results in displacement of interfacing elements, each interfaces a respective proximal end portion and causing said transition.

In some embodiments, the method further comprising locking the arms in their deployed state. The locking is performed by a geometrical locking, thus not allowing the arms to return to their non-deployed state.

In some embodiments of the method, the drone is any one of the above-described embodiments relating to the drone aspect.

EMBODIMENTS

The following are optional embodiments and combinations thereof in accordance with aspects of the present disclosure:
1. A drone comprising:
   a body defining a central axis;
   two or more arms, each arm (i) comprises a rotor disposed at a distal end portion, and (ii) being pivotally coupled to the body at a proximal end portion to allow a pivotal transition between a first, non-deployed state in which the arms extend substantially in the axial direction, and a second, deployed state in which the arms extend from the body substantially in the radial direction;
   a biasing assembly that comprises (i) at least one biasing element, and (ii) at least one interfacing element configured to displace by the biasing element, between a non-biased state and a biased state; wherein
   (i) during said displacement of the at least one interfacing element, each of the at least one interfacing element is configured to engage the proximal end portion of each respective arm so as to apply a biasing force sufficient to cause said pivotal transition, and wherein (ii) when the biasing assembly is in the biased state, each interfacing element restricts the pivotal movement of the arm and restrains it in the deployed state.
2. The drone of embodiment 1, comprising equal number of interfacing elements as arms such that each arm has its own respective interfacing element.
3. The drone of embodiment 1 or 2, wherein interfacing element is a bearing that bears on an integral lever portion of the arm.
4. The drone of any one of embodiments 1-3, wherein the arm is pivoted to the body by a pivot in between a main arm portion and the lever portion.
5. The drone of embodiment 3 or 4, wherein the lever portion has an interfacing rim portion, and the interfacing element interfaces with said rim portion during said transition.
6. The drone of embodiment 5, wherein the at least one interfacing element slides on said interfacing rim portion during said transition.
7. The drone of embodiment 5 or 6, wherein the rim portion is substantially planar.
8. The drone of any one of embodiments 5-7, wherein in the non-biased state the rim portion is located axially to the interfacing element and in the biased state the rim portion located radially to the interfacing element.
9. The drone of any one of embodiments 5-8, wherein the lever portion comprises a hollowed portion for reducing weight of the arm.
10. The drone of embodiment 9, wherein in the non-biased state the hollowed portion is located axially to the rim portion, and in the biased state the hollowed portion located radially to the rim portion.
11. The drone of any one of embodiments 3-10, wherein the lever portion is generally angled with respect to the main arm portion.
12. The drone of any one of embodiments 1-11, wherein the biasing element is a spring.
13. The drone of any one of embodiments 1-12, wherein the transition between the biased state and a non-biased state causes the simultaneous transition between the non-deployed state and the deployed state.
14. The drone of any one of embodiments 1-13, wherein the biasing assembly comprises an axially displaceable member that is biased, by the biasing element, to displace between a retracted state to an extended state, said member being coupled to or integral with the interfacing element, whereby the displaceable member causes displacement of the interfacing element between respective non-biased and biased states.
15. The drone of embodiment 14, wherein
   said displaceable member is an annular piston displaceable along a central shaft that guides displacement of said member, and
   the biasing element is a helical spring fitted around said shaft and received in a spring seat within the piston.
16. The drone of embodiment 14 or 15, wherein the displaceable member displaces along the central axis.
17. The drone of any one of embodiments 14-16, wherein the displaceable member comprises radial projections holding said interfacing element.
18. The drone of embodiment 17, wherein
   the radial projections have tangential pins, and wherein
   the interfacing element is a bearing revolvably mounted on said pins.
19. The drone of any one of embodiments 14-18, wherein the biasing assembly and/or the displaceable member is associated with the body such that it is capable of moving on a plane defined normal to the central axis.
20. The drone of embodiment 19, wherein the displaceable member is rotatable about at least two axes in said plane.
21. The drone of embodiment 19 or 20, wherein said displaceable member comprise a lumen and the biasing assembly comprises a shaft being received within said lumen to allow the displacement of the displaceable member, wherein the transversal cross section of the lumen is larger than the transversal cross section of the shaft, allowing said movement on said plane and the rotation about at least two axes in said plane.
22. The drone of any one of embodiments 1-21, wherein the at least one interfacing element is constituted by a projection.
23. The drone of embodiment 22, wherein the projections are configured to engage with an integral lever portion of the arm
24. The drone of embodiment 23, wherein said projection projects normal to the central axis.

25. The drone of embodiment 23 or 24, wherein said projection is fitted with an adjustable extension for adjusting the effective length of the projection.

26. The drone of embodiment 25, wherein the adjustable extension is a screwing element fitted within a screwing space of the projection.

27. The drone of any one of embodiments 1-26, wherein each arm comprises a limiting edge formed at the proximal end to limit the axial displacement of the biasing assembly.

28. The drone of embodiment 27, wherein the limiting edge is configured to engage one or more of the at least one interfacing element while the arms are in the deployed state.

29. The drone of any one of embodiments 1-28, wherein in the non-biased state the proximal portion of each arm is located between each of the respective at least one interfacing element and the rotor along axes defined parallel to the central axis such that a displacement directionality along the central axis of the at least one interfacing element causes the engagement of it with the proximal portion of the arm.

30. A container comprising the drone of any one of embodiments 1-29.

31. The container of embodiment 30, wherein the drone is housed within the container with its arms in a non-deployed state.

32. A method for deploying arms of a drone following its launch from a container, the drone comprising a body defining central axis, each arm (i) comprises a rotor disposed at a distal end portion, and (ii) being pivotally coupled to the body at a proximal end portion to allow a pivotal transition between a first, non-deployed state in which the arms extend substantially in the axial direction, and a second, deployed state in which the arms extend from the body substantially in the radial direction, and is pivoted to the body by a pivot in between a main arm portion and a lever portion, the method comprising:
applying a single biasing force causing simultaneous transition of all the arms between the non-deployed state to the deployed state.

33. The method of embodiment 32, wherein the biasing force results in displacement of interfacing elements, each interfaces a respective proximal end portion and causing said transition.

34. The method of embodiment 32 or 33, further comprising geometrical locking the arms in their deployed state.

35. The method of any one of embodiments 32-34, wherein the drone is any one of embodiments 1-28.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIGS. 1A-1B, 1F-1G show the drone in its non-deployed state, FIGS. 1E, 1H-1K show the drone in its deployed state and FIGS. 1C-1D show the drone during transition between the non-deployed state and the deployed state. FIG. 1A is a cross-sectional view of the drone; FIG. 1B is a cross-sectional view focusing on the biasing assembly and its interface with the arms in the non-deployed state; FIG. 1C-1D are cross-sectional views focusing on the biasing assembly and its interface with the arms showing different phases in the transition between the non-deployed state and the deployed state; FIG. 1E is a cross-sectional view focusing on the biasing assembly and its interface with the arms in the deployed state; FIG. 1F is a cross-sectional view focusing on the biasing assembly and its interface with the arms in the non-deployed state showing the biasing element; FIG. 1G is a cross-sectional view of the drone housed within a launching container; FIG. 1H is a perspective exploded view of a part of the drone in its deployed state; FIG. 1I is a top exploded view of a part of the drone in its deployed state; FIG. 1J is a cross-sectional view of the drone; FIG. 1K is a cross-sectional view that is focused on the biasing assembly.

FIG. 2A shows the biasing assembly and the arms in the non-deployed state; FIG. 2B shows them in during the transition between states; and FIG. 2C shows them in the deployed state.

DETAILED DESCRIPTION

The following figures are provided to exemplify embodiments and realization of the invention of the present disclosure.

Figure 1A:
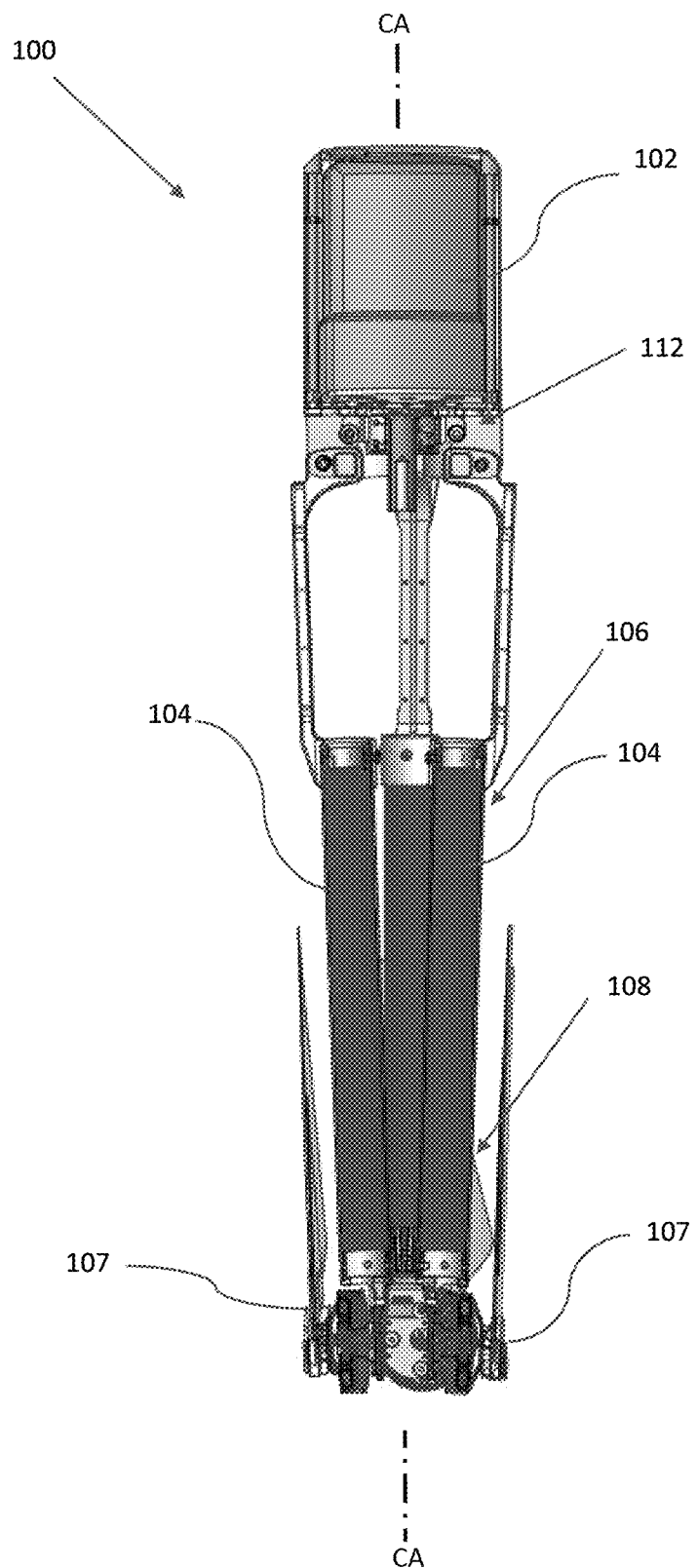
FIGS. 1A-1K are illustrations of a different views of a non-limiting example of the drone, or parts thereof, according to an aspect of the present disclosure.
Figure 1B:
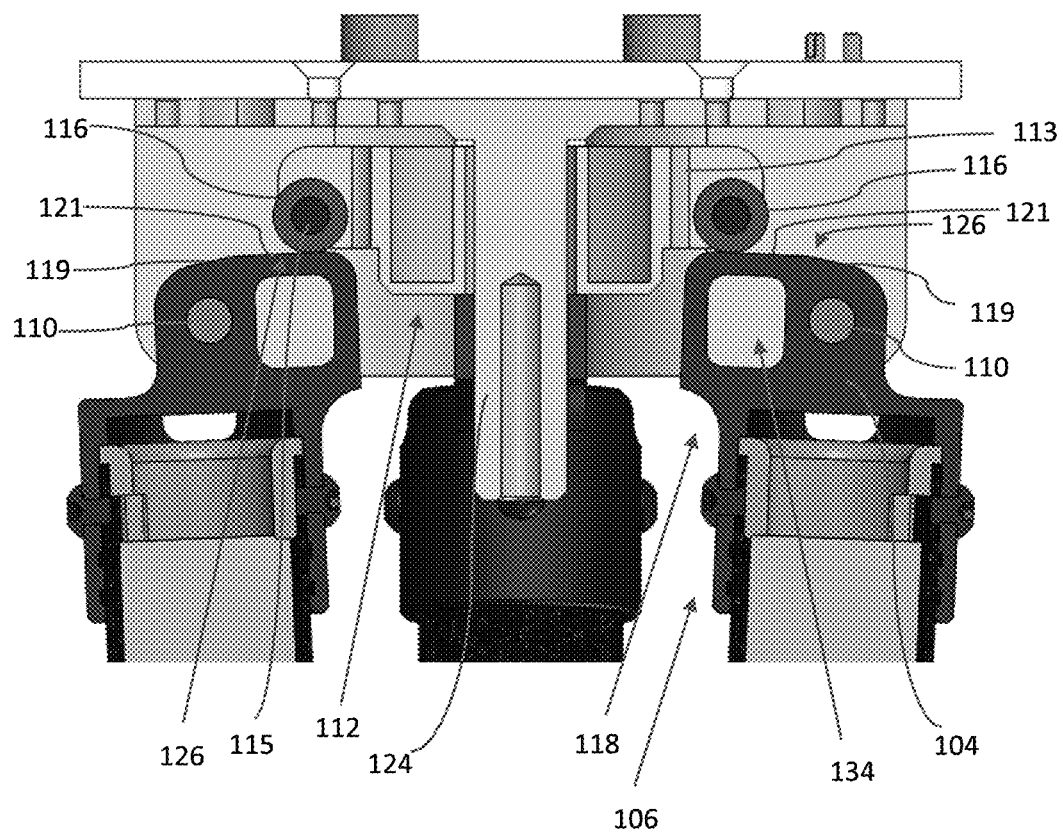
Figure 1C:
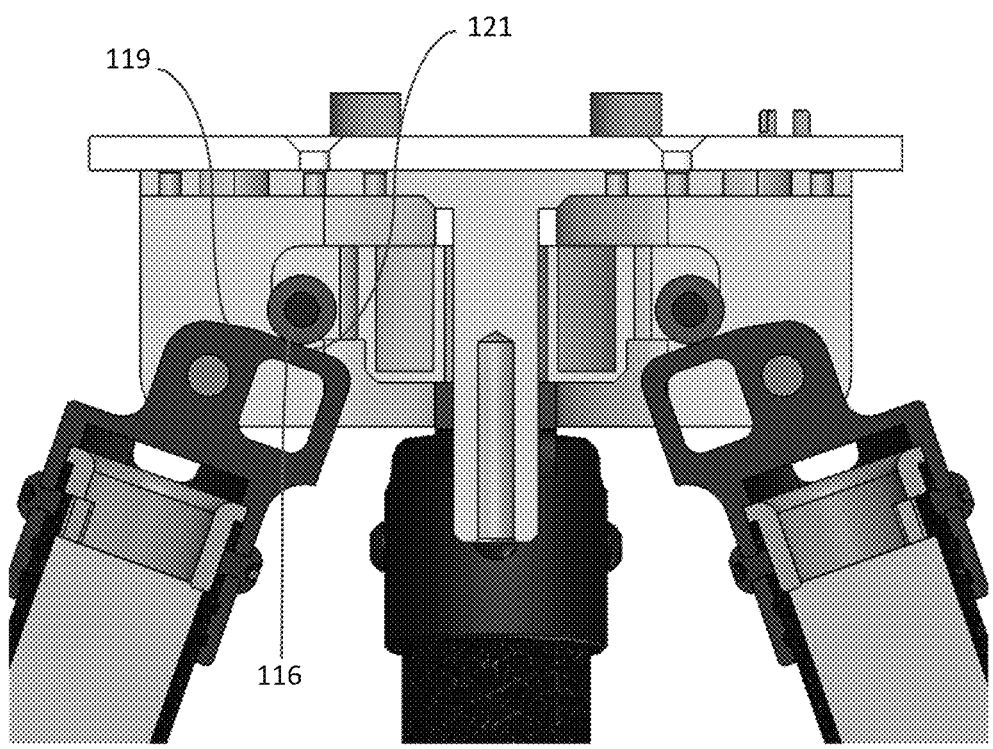
Figure 1D:
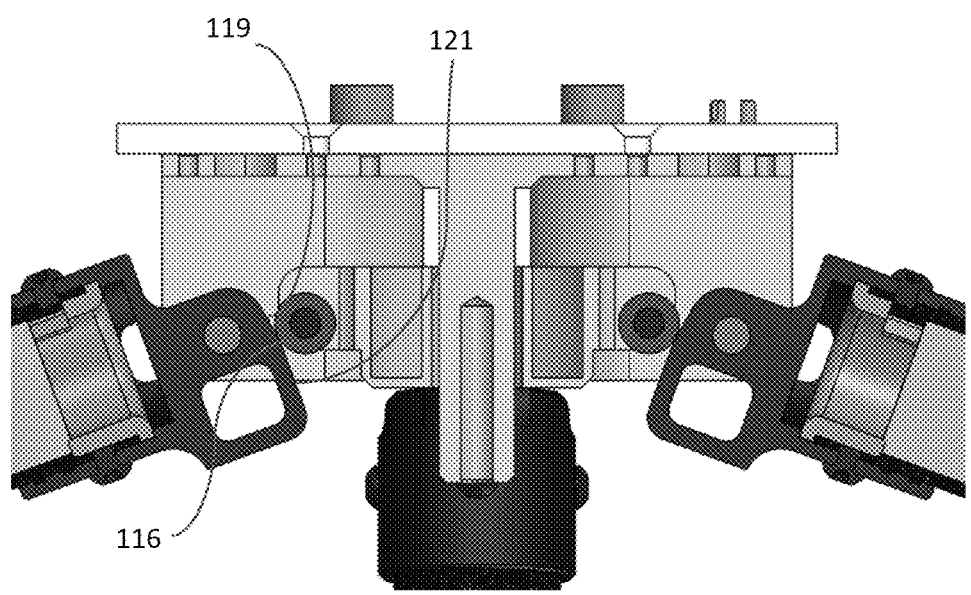

Reference is first being made to FIGS. 1A-1K, which are illustrations of a non-limiting example of an embodiment of the drone and/or its deployment and locking mechanism according to an aspect of the present disclosure. FIGS. 1E, 1H-1K show the drone in its non-deployed state, FIGS. 1E, 1H-1K show the drone in its deployed state and FIGS. 1C-1D show the drone during transition between the non-deployed state and the deployed state.

The drone 100 includes a body 102 defining a central axis CA along the longitude of the drone 100. The drone 100 further includes arms 104 each pivotally coupled to the body 102 at its proximal end portion 106 and is having a rotor 107 on its distal end portion 108. The proximal end portion is defined by the half portion of the arm that is proximal to the body and the distal portion is defined by the half portion of the arm that is distal from the body. The arms are pivoted to the body by a pivoting element 110 to allow a pivotal movement of the arm for transition from a non-deployed state to a deployed state of the arms. In the non-deployed state, the arms are generally extending parallel to the central axis CA and in the deployed state, the arms are extending radially with respect to the central axis CA.

Figure 1E:
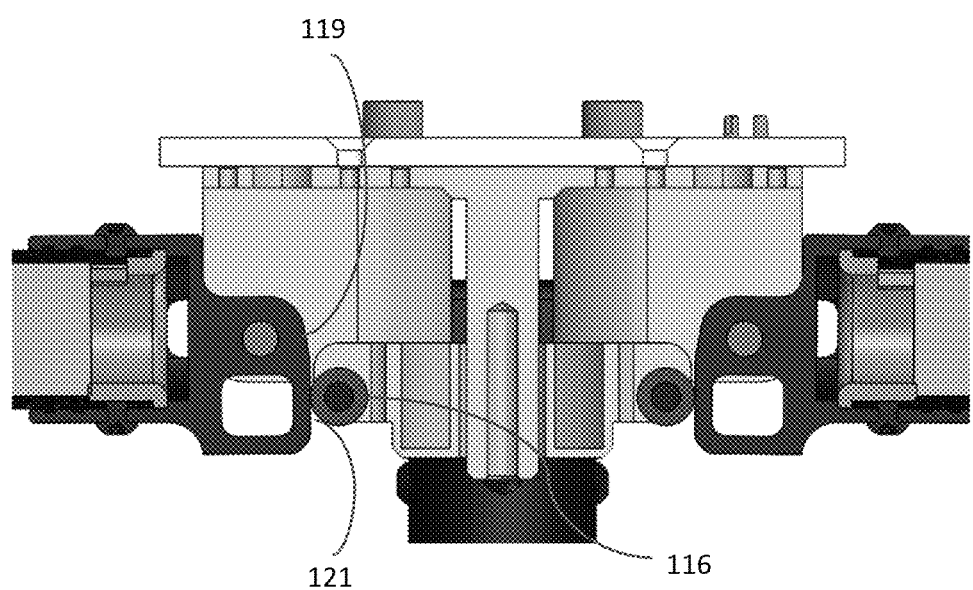
Figure 1F:
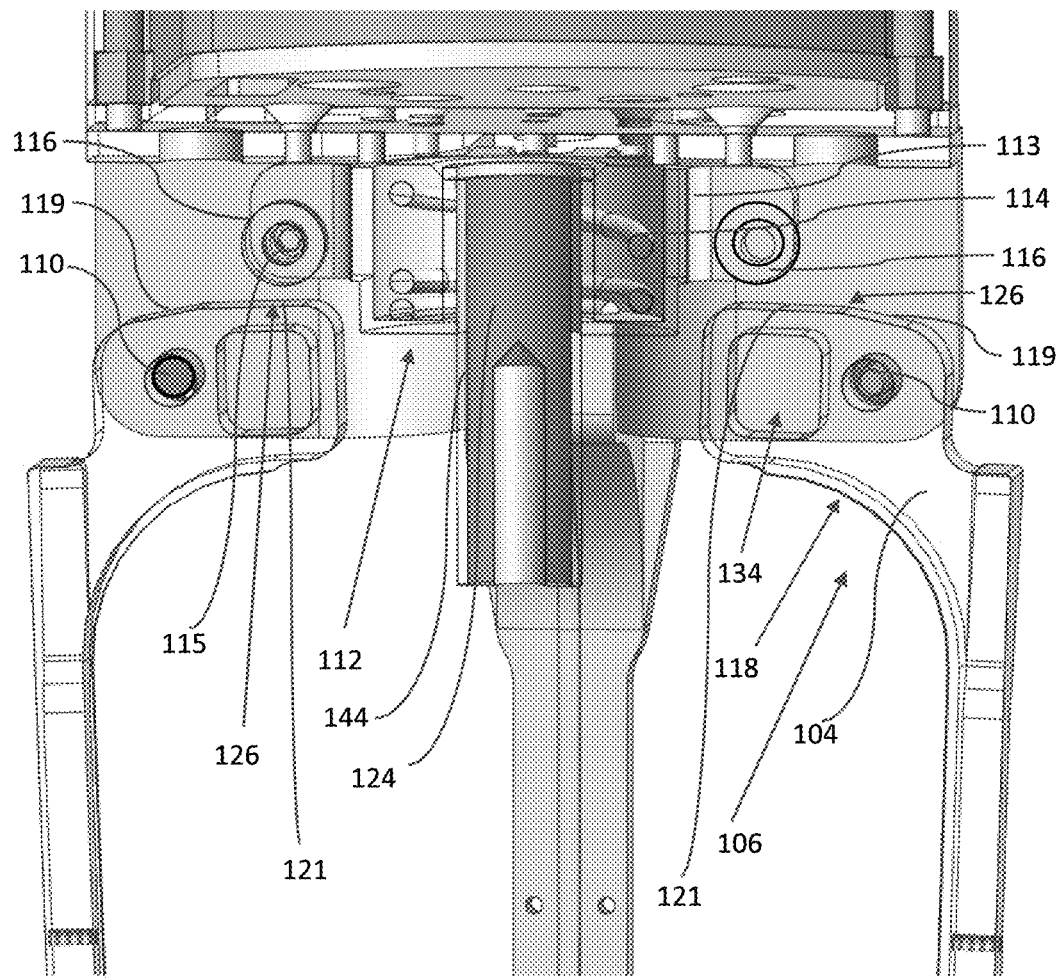
Figure 1G:
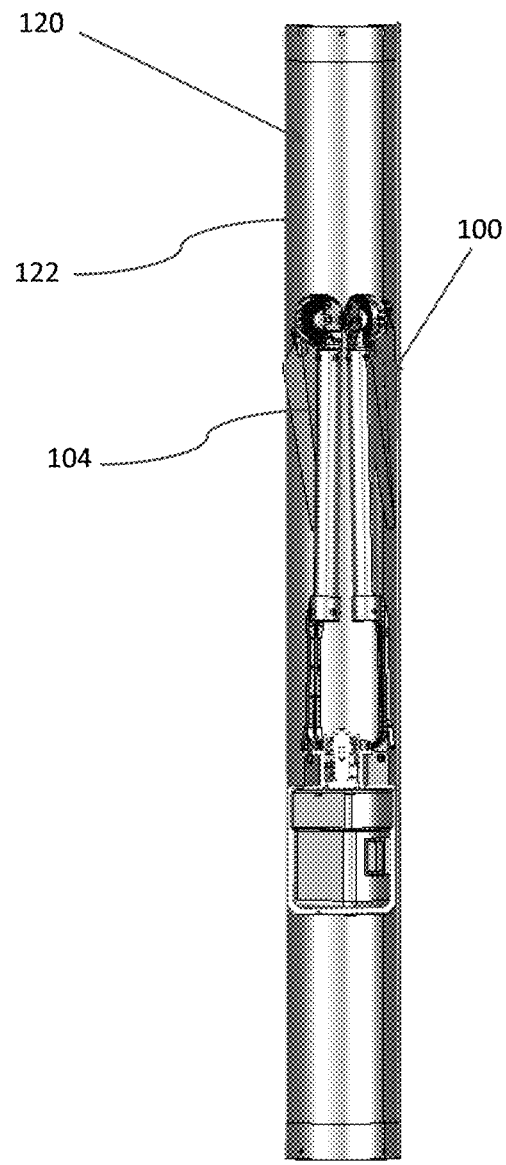

A biasing assembly 112 of the drone 100 includes a biasing element 114 in the form of a spring that is capable of transitioning between a non-biased state, i.e. a state where the spring is tensioned, and a non-biased state, i.e. a state where the spring is released. The biasing assembly 112 further includes a displaceable member 113 and interfacing elements 116 integral with the displaceable member 113, both movable with the biasing element, each interfacing element 116 interfaces with a respective arm 104. Each interfacing element 116 is held by a pin 115 formed on a respective projection 117 that is radially projecting from the displaceable member 113, the pin is oriented tangentially with respect to the radial direction defined by the arms 104. The movement of the biasing element 114, the displaceable member 113 and the interfacing elements 116 resulting in the transition of the arms from the non-deployed state to the deployed state by application of force of the interfacing elements 116 on a lever portion 118 of the arms 104. While the drone is housed within a drone container 120, e.g. prior to its launch therefrom, the walls 122 of container 120 apply a balancing torque to the torque applied by the interfacing elements 116 on the arms 104, as can be seen in FIG. 1G, and the arms 104 retain in their non-deployed state. Once the drone 100 is ejected from the container 120, the biasing element 114 is displaced to its biased state, namely to its released, non-tensioned state, and each interfacing element 116 urges against the respective lever portion 118 and causes the arm 104 to pivot from the non-deployed state to the deployed state, as can be seen in FIGS. 1B-1E.

The displaceable member 113 axially displaces along an axial guiding element 124 that extends along the central axis CA. The biasing element 114 is accommodated within a volume confined by the displaceable member 113, and displacement of the biasing element 114 causes a corresponding displacement of the displaceable member 113 such that the displacement of the two is simultaneous.

Figure 1H:
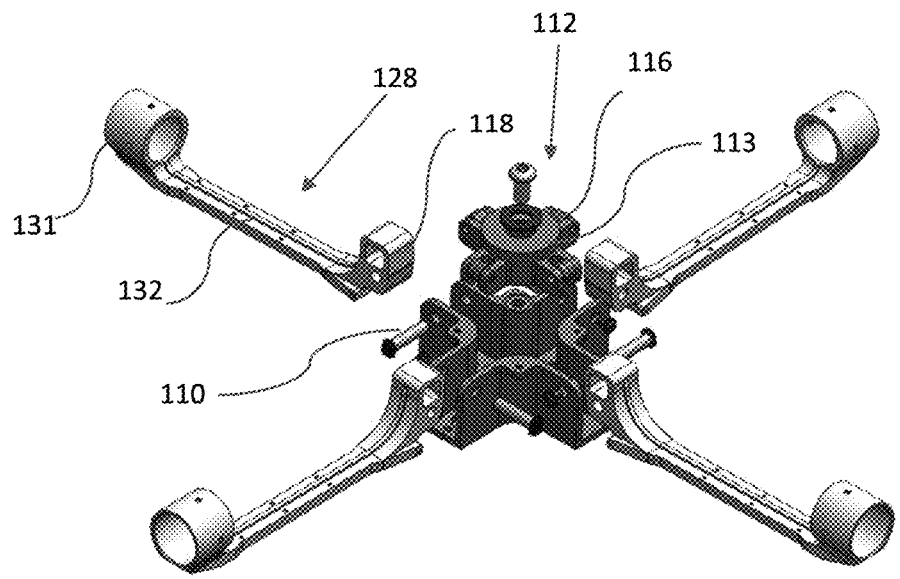
Figure 1I:
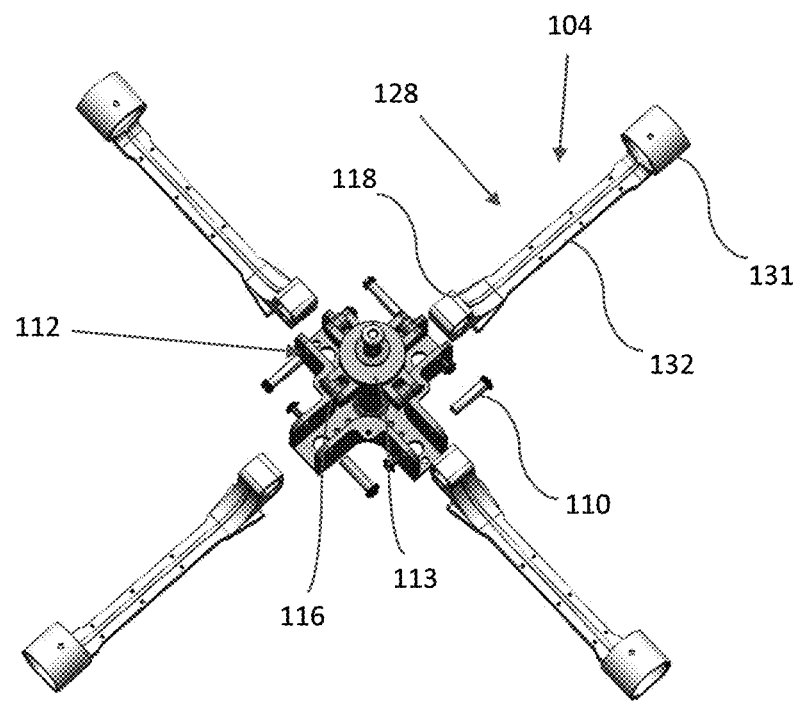
Figure 1J:
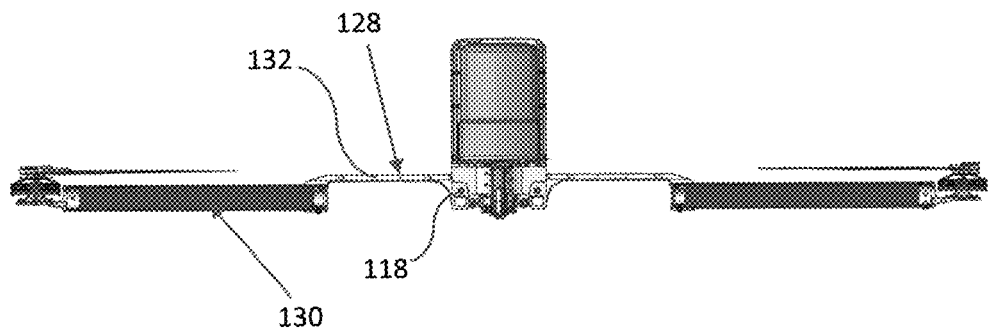
Figure 1K:
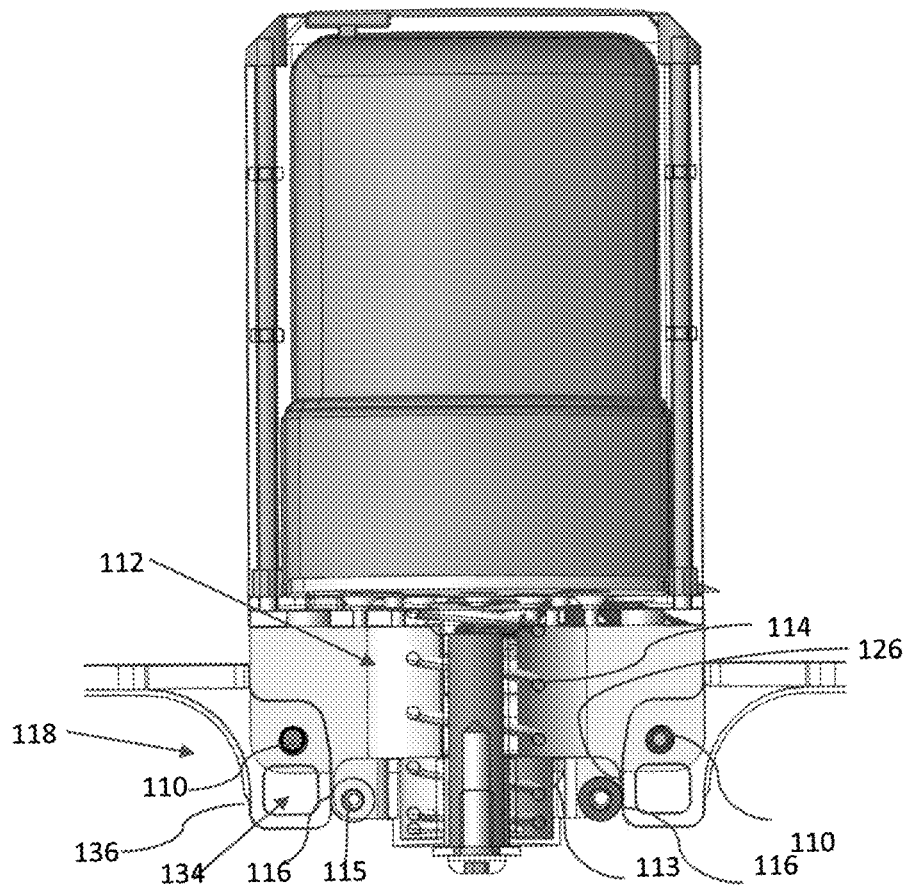

Each interfacing element 116 engages an interface rim portion 126 at the lever portion 118 of the arm 104. The rim portion is a part of the peripheral rim defining the arm. In the non-deployed state, the interface rim portion 126 and the interfacing elements 116 are axially aligned with respect to one another, as can be best seen in FIG. 1B, and in the deployed state, the interface rim portion 126 and the interfacing elements 116 are radially aligned with respect to one another, as can be best seen in FIG. 1E. The interface rim portion 126 that is part of the arms of the drone includes a first section 119 and a second, planar, section 121. The interfacing elements 116 engage the first and the second sections 119 and 121 intermittently during the transition from the non-deployed state to the deployed state. FIGS. 1B-1E shows the engagement pattern of the engaging elements 116 of the biasing assembly 112 with the interface rim portion 126, namely with the first and the second sections 119 and 121 during the transition from the non-deployed state to the deployed state. At the beginning of the transition, as shown in FIG. 1B, the engaging elements 116 engage the second section 121 at a most distal position to the first section 119. FIG. 1C shows a more progressed phase of the transition, in which the engaging elements 116 still engage the second section 121 and getting more proximal to the first section 119. In FIG. 1D it is shown that the engaging elements 116 engage the first section 119, and at the end of the transitioning, as shown in FIG. 1E, the engaging elements 116 engage again the second section 121 to provide a geometrical lock. The interface rim portion 126 includes a geometrical discontinuity profile in the transition between the first and the second sections, resulting in a disengagement between the engaging elements 116 and the interface rim portion 126 when the engagement of the engaging elements 116 transitioning between the first and the section sections 119 and 121 and vice versa. It is to be noted that the engagement with the first section 119 can be only with the transition portion between the first and second sections 119 and 121, namely with the geometrical discontinuity profile. The first section 119 may be curved or planar that defines a plane angled to the plane defined by the second, planar, section 121. This structure ensures that the transition is carried out completely and does not stop in an intermediate position. At the end of the transition, the biasing element reaches its most extended range and this results in that the interfacing elements 116 engaging the second, planar, section 121 such that the force that may be applied on the interfacing element by the arms cannot result in the compression of the biasing element and any force applied by the interfacing element on the arm cannot result in a torque that causes the transition of the arm back to the folded state, thereby causing a geometrical locking. In order to permit the reverse transition of the arms back to the folded state, an axial force on the biasing element needs to be applied in the direction causing the compression of the biasing element, followed by application of torque on the arms that causes the arms to pivot into the folded state. Each arm 104 is formed by a proximal segment 128 that comprises the lever portion 118 and a distal segment 130 on which the rotor 107 is mounted. The proximal segment 128 is coupled to the body 102 via the pivoting element 110 at the lever portion 118 and is coupled to the distal segment 130 at an opposite side. The proximal segment 128 is constituted by the lever portion 118 and an elongated part 132. The lever portion 118 projects from the elongated part 132 and thus angled thereto. FIGS. 1H-1I are different exploded views of the drone in its deployed state, not showing the distal segment. As can be seen in these figures, the proximal segment 128 includes a receiving arrangement 131 for receiving the distal segment 130.

Furthermore, the lever portion 118 of each arm includes a hollowed portion 134 for reducing the weight of the arm while maintaining its peripheral dimensions, namely its contour.

Figure 2A:
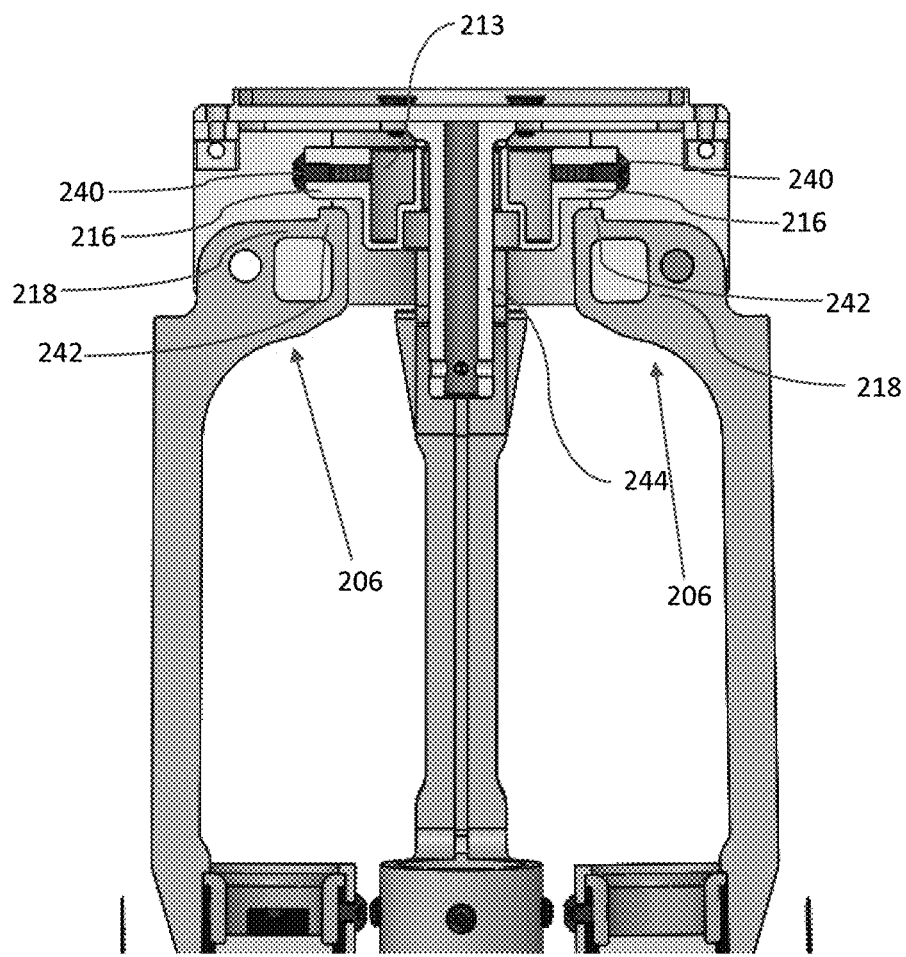
FIGS. 2A-2C are schematic illustrations of cross-sectional views of a non-limiting example of the biasing assembly and the arms of the drone according to an aspect of the present disclosure.
Figure 2B:
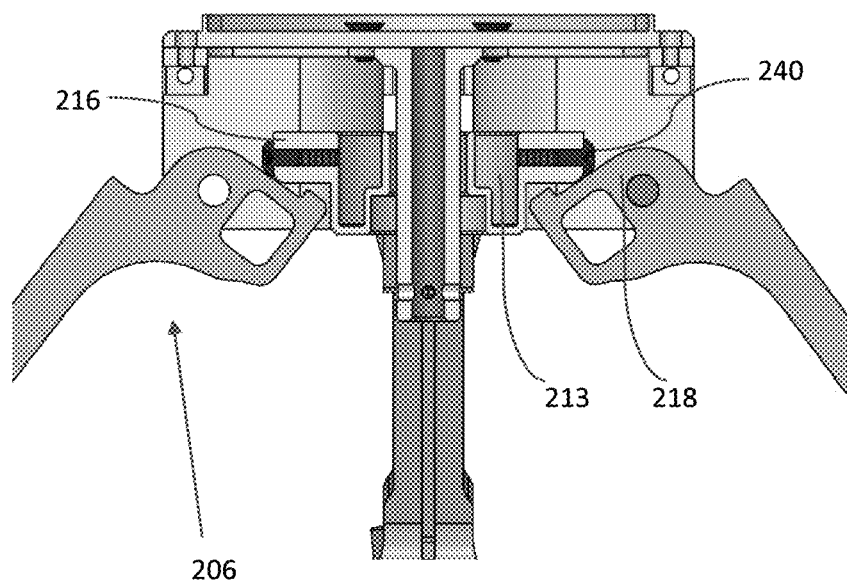
Figure 2C:
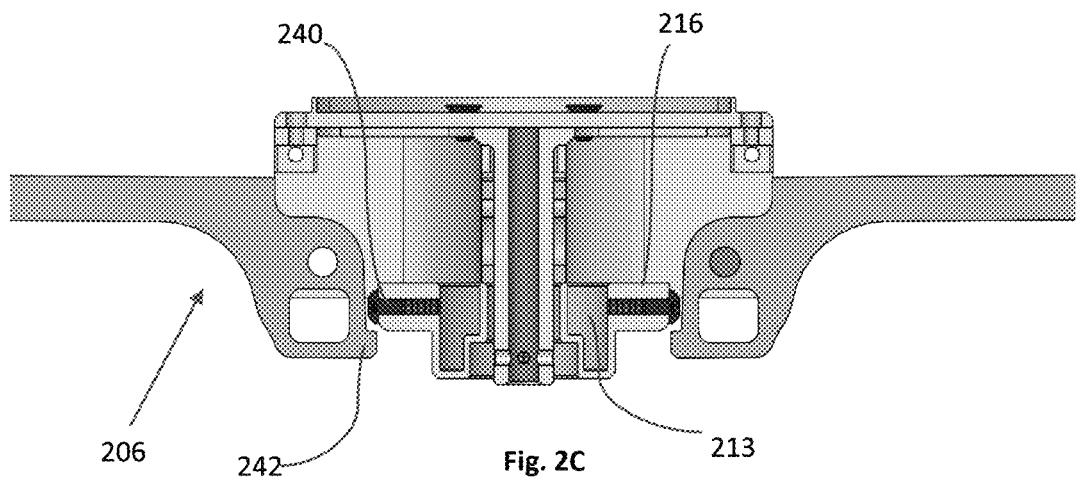

FIGS. 2A-2C are schematic illustrations of cross-sectional views of another embodiment of a non-limiting example of the biasing assembly and the arms of the drone of the present disclosure. In this example, the interfacing elements 216 are in the form of projections projecting normal to the central axis. In the non-biased state, as shown in FIG. 2A, the interfacing elements 216 are not in contact with the proximal end portions 206 of the arms. The proximal end portions 206 of the arms are located in the displacement path of the interfacing elements 206 such that during the displacement of the displaceable member 213 the projections engages with the proximal end portions 206 of the arms, or in particular a lever portion 218 in the proximal end portion of each arm, and applying on them force causing the transition between a first, non-deployed state in which the arms extend substantially in the axial direction, and a second, deployed state in which the arms extend from the body substantially in the radial direction (FIG. 2B shows the transition state and FIG. 2C shows the deployed state of the arms).

The interfacing 216 elements comprises adjustable extensions 240 configured to allow to effectively extend the length of the interfacing element along an axis normal to the central axis. The extensions may then be adjusted separately for each arm, preventing an incomplete transition to the deployed state where one or more arms does not contact the interfacing element due to manufacturing tolerances or other factors. In this non-limiting example the adjustable extensions are in the form of screws that fit within an internal thread of the interfacing elements 216, though it is to be noted that other solutions are optional as well.

Furthermore, in this example, the proximal end portions 206 of the arms comprises a limiting edge 242 that is configured to limit the displacement movement of the interfacing elements 216 and the displaceable member 213 at the end of the transition to the deployed state. The arms are restricted in movement beyond the 90° rotation that they perform in the transition from the non-deployed state to the deployed state, and in the end of this transition the interfacing elements 216 may reach a stopping condition where they engage the limiting edge that protrudes, in the deployed state, in a direction normal to the central axis towards the displaceable member 213 such that a portion of each interfacing element 216 engages with the respective limiting edge 242 and is prevented to continue in the movement of the displacement caused by the biasing element. Alternatively, one or more interfacing elements 216 may contact its corresponding arm so that friction and reaction forces from the arm create a jamming condition that prevents the displaceable member from advancing to the point where the interfacing element 216 contacts the limiting edge 242.

In the example shown in FIGS. 1A-1K and also in the example shown in FIGS. 2A-2C, the displaceable member 113/213 mainly displaces along a shaft 144/244. Namely, the displaceable member 113/213 comprises a lumen surrounding the shaft 144/244. The shaft 144/244 can be either (i) tightly surrounded by the displaceable member 113/213 therefore the displacement of the displaceable member 113/213 is limited mainly along the central axis or (ii) loosely surrounded by the displaceable member 113/213, namely that there is a gap between the shaft and the internal walls of the lumen, allowing the displaceable member 113/213 to have several degrees of freedom in its movement, e.g. displacement along the central axis, displacement on a plane defined normal to the central axis and/or rotation about two or more axes defined on said plane defined normal to the central axis.

In embodiments where the displaceable member 113/213 possesses the degrees of freedom mentioned above, the interfacing element contacting each arm may reach any combination of stopping conditions and jamming conditions, with the displaceable member 213 reaching a slightly rotated position so that most or all of the arms are in contact with the interfacing elements 216.

The invention claimed is:

1. A drone comprising:
   a body defining a central axis;
   two or more arms, each arm (i) comprises a rotor disposed at a distal end portion, and (ii) being pivotally coupled to the body at a proximal end portion to allow a pivotal transition between a first, non-deployed state in which the arms extend substantially in the axial direction, and a second, deployed state in which the arms extend from the body substantially in the radial direction;
   wherein each arm is pivotably connected to the body by a pivot in between a main arm portion that comprises the rotor and a lever arm portion;
   a biasing assembly that comprises (i) at least one biasing element, and (ii) at least one interfacing element being configured to displace by the biasing element, between a non-biased state and a biased state; wherein
   (i) during said displacement of the at least one interfacing element, each of the at least one interfacing element is configured to engage the proximal end portion of each respective arm so as to apply a biasing force sufficient to cause said pivotal transition about said pivot, wherein the pivot is different than the at least one interfacing element, and wherein (ii) when the biasing assembly is in the biased state, each interfacing element restricts the pivotal movement of the arm and restrains it in the deployed state;
   wherein the interfacing element is not integral with or coupled to the arm;
   wherein the interfacing element is either (1) a bearing that bears on said lever portion of the arm, or (2) is constituted by a projection, wherein the projection projects normal to the central axis and is configured to engage with said lever portion of the arm;
   wherein the lever portion has an interfacing rim portion, and the interfacing element interfaces with said rim portion during said transition, and wherein in the non-biased state the rim portion is located axially to the interfacing element and in the biased state the rim portion is located radially to the interfacing element.

2. The drone of claim 1, comprising equal number of interfacing elements as arms such that each arm has its own respective interfacing element.

3. The drone of claim 1, wherein the main portion is substantially planar.

4. The drone of claim 1, wherein the biasing assembly comprises an axially displaceable member that is biased, by the biasing element, to displace between a retracted state to an extended state, said member being coupled to or integral with the interfacing element, whereby the displaceable member causes displacement of the interfacing element between respective non-biased and biased states.

5. The drone of claim 4, wherein said displaceable member is an annular piston displaceable along a central shaft that guides displacement of said member, and
   the biasing element is a helical spring fitted around said shaft and received in a spring seat within the piston; and
   wherein the displaceable member displaces along the central axis.

6. The drone of claim 4, wherein the displaceable member comprises radial projections holding or constituting said interfacing element.

7. The drone of claim 4, wherein the displaceable member is capable of moving on a plane defined normal to the central axis.

8. The drone of claim 7, wherein the displaceable member is rotatable about at least two axes in said plane.

9. The drone of claim 8, wherein said displaceable member comprise a cavity and the biasing assembly comprises a shaft being received within said cavity to allow the displacement of the displaceable member, wherein the transversal cross section of the cavity is larger than the transversal cross section of the shaft, allowing said moving on said plane and the rotation about at least two axes in said plane.

10. The drone of claim 1, wherein said projection is fitted with an adjustable extension for adjusting the effective length of the projection.

11. The drone of claim 1, wherein each arm comprises a limiting edge formed at the proximal end to limit the axial displacement of the biasing assembly;
    wherein the limiting edge is configured to engage one or more of the at least one interfacing element while the arms are in the deployed state.

12. A drone comprising:
    a body defining a central axis;
    two or more arms, each arm (i) comprises a rotor disposed at a distal end portion, and (ii) being pivotally coupled to the body at a proximal end portion to allow a pivotal transition between a first, non-deployed state in which the arms extend substantially in the axial direction, and a second, deployed state in which the arms extend from the body substantially in the radial direction;
    wherein each arm is pivotably connected to the body by a pivot in between a main arm portion that comprises the rotor and a lever arm portion;
    a biasing assembly that comprises (i) at least one biasing element, and (ii) at least one interfacing element being configured to displace by the biasing element, between a non-biased state and a biased state; wherein
    (i) during said displacement of the at least one interfacing element, each of the at least one interfacing element is configured to engage the proximal end portion of each respective arm so as to apply a biasing force sufficient to cause said pivotal transition about said pivot, wherein the pivot is different than the at least one interfacing element, and wherein (ii) when the biasing assembly is in the biased state, each interfacing element restricts the pivotal movement of the arm and restrains it in the deployed state;

wherein the interfacing element is not integral with or coupled to the arm;

wherein the interfacing element is constituted by a projection, wherein the projection projects normal to the central axis and is configured to engage with said lever portion of the arm;

wherein the lever portion has an interfacing rim portion, and the interfacing element interfaces with said rim portion during said transition, and wherein in the non-biased state the rim portion is located axially to the interfacing element and in the biased state the rim portion is located radially to the interfacing element;

wherein during the transition between the first state to the second state, the interfacing element interfaces with a first section of the rim portion and in the second state, the interfacing element engages with a second, planar section of the rim portion;

wherein said projection is fitted with an adjustable extension for adjusting the effective length of the projection.

13. A drone comprising:

a body defining a central axis;

two or more arms, each arm (i) comprises a rotor disposed at a distal end portion, and (ii) being pivotally coupled to the body at a proximal end portion to allow a pivotal transition between a first, non-deployed state in which the arms extend substantially in the axial direction, and a second, deployed state in which the arms extend from the body substantially in the radial direction;

wherein each arm is pivotably connected to the body by a pivot in between a main arm portion that comprises the rotor and a lever arm portion;

a biasing assembly that comprises (i) at least one biasing element, and (ii) at least one interfacing element being configured to displace by the biasing element, between a non-biased state and a biased state; wherein (i) during said displacement of the at least one interfacing element, each of the at least one interfacing element is configured to engage the proximal end portion of each respective arm so as to apply a biasing force sufficient to cause said pivotal transition about said pivot, wherein the pivot is different than the at least one interfacing element, and wherein (ii) when the biasing assembly is in the biased state, each interfacing element restricts the pivotal movement of the arm and restrains it in the deployed state;

wherein the interfacing element is not integral with or coupled to the arm;

wherein the interfacing element is either (1) a bearing that bears on said lever portion of the arm, or (2) is constituted by a projection, wherein the projection projects normal to the central axis and is configured to engage with said lever portion of the arm;

wherein the lever portion has an interfacing rim portion, and the interfacing element interfaces with said rim portion during said transition, and wherein in the non-biased state the rim portion is located axially to the interfacing element and in the biased state the rim portion is located radially to the interfacing element;

wherein the biasing assembly comprises an axially displaceable member that is biased, by the biasing element, to displace between a retracted state to an extended state, said displaceable member being coupled to or integral with the interfacing element, whereby the displaceable member causes displacement of the interfacing element between respective non-biased and biased states;

wherein the displaceable member is capable of moving on a plane defined normal to the central axis;

wherein the displaceable member is rotatable about at least two axes in said plane;

wherein said displaceable member is an annular piston that comprises a cavity and the biasing assembly comprises a shaft being received within said cavity to allow the displacement of the displaceable member;

the biasing element is a helical spring fitted around said shaft; and wherein the transversal cross section of the cavity is larger than the transversal cross section of the shaft for allowing said moving on said plane and the rotation about at least two axes in said plane.

* * * * *